Nov. 21, 1939.　　　C. P. SHERWOOD　　　2,181,075
FLOW METER SYSTEM
Filed Aug. 8, 1934　　　2 Sheets-Sheet 1

INVENTOR.
Carroll P. Sherwood,
BY John D. Myers
ATTORNEY.

Nov. 21, 1939.     C. P. SHERWOOD     2,181,075
FLOW METER SYSTEM
Filed Aug. 8, 1934     2 Sheets-Sheet 2
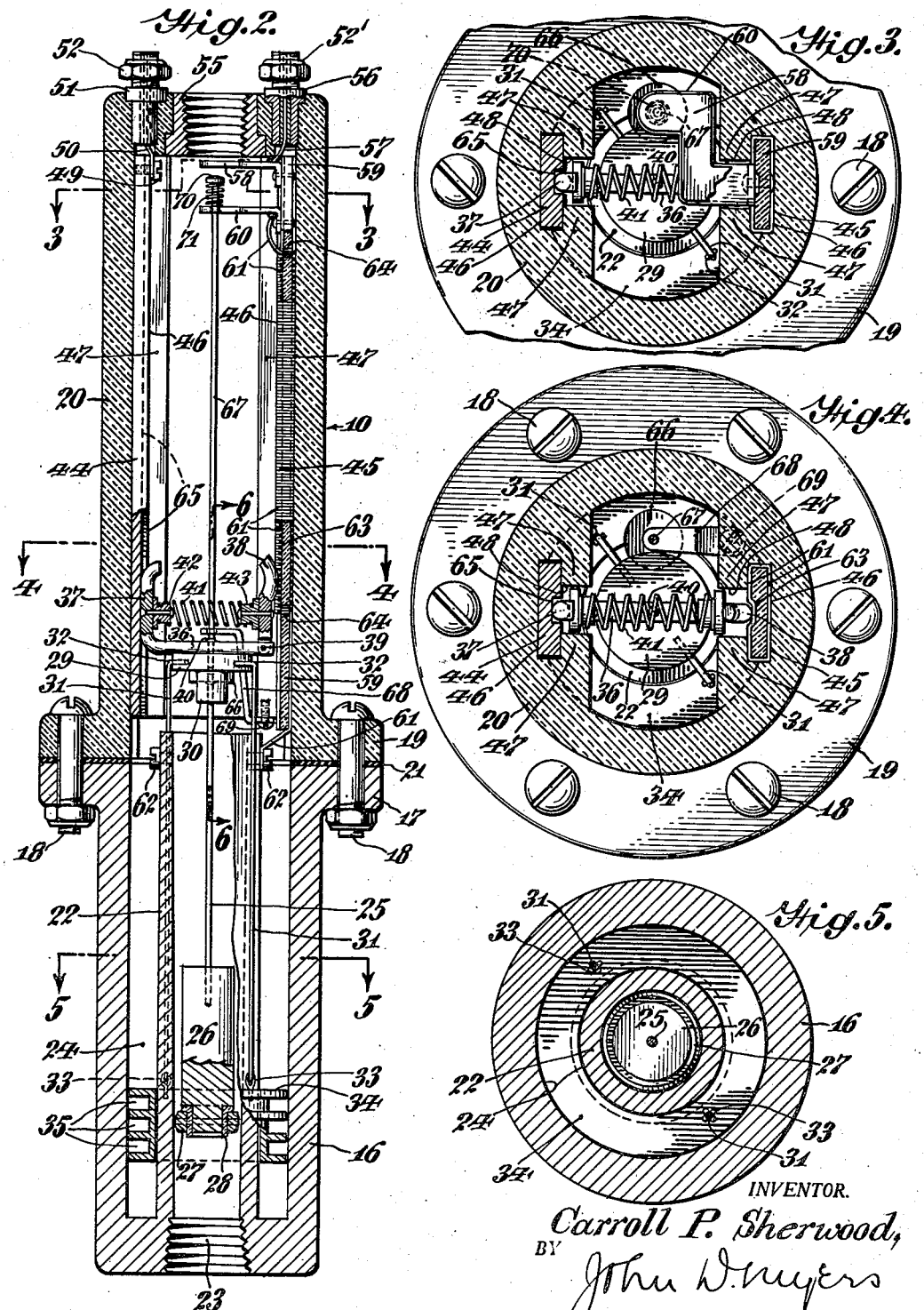
INVENTOR.
Carroll P. Sherwood,
BY John D. Myers
ATTORNEY.

Patented Nov. 21, 1939

2,181,075

UNITED STATES PATENT OFFICE 2,181,075

FLOW METER SYSTEM

Carroll P. Sherwood, Camden, N. J.

Application August 8, 1934, Serial No. 738,968

6 Claims. (Cl. 73—209)

The invention relates to flow meter systems and involves certain new and useful combinations of elements for continuously and accurately indicating the rate of flow of a fluid, as well as certain improvements in the elements of the combinations.

As disclosed herein, the invention is particularly adapted for use in indicating the rate of consumption of a combustible liquid, such as gasoline, by internal combustion engines utilized for propelling automobiles, motor-boats, airplanes and other vehicles.

In the operation of engines of such character, it is customary to provide a fuel supply tank located at a distance from the engine and to convey the fuel from the supply tank to the engine through a suitable fuel pipe. It is also customary to utilize in the operation of such engines a source of electric current, such as a battery and/or a generator, the available energy from which necessarily varies from time to time in accordance with the condition of the source of energy or the charging rate of the generator, and the various purposes for which current may be utilized at any particular time. The relative positions of the fuel supply tank, the engine, and the operator of the vehicle make it difficult to so locate the fuel line as to render a flow indicator connected therein directly visible to the operator. For this and other reasons an electrically operated indicator is preferable, as the indicator itself may be readily positioned within the view of the operator and suitably connected to a remote metering device so arranged as to be operated in response to changes in the rate of flow of the fuel in the fuel line.

One of the objects of the invention is the provision of a simple and compact system for continuously indicating the rate of flow of a liquid such as gasoline or the like.

A further object of the invention is the provision of a flow meter system which indicates with reasonable accuracy the rate of flow of the liquid notwithstanding shocks and other physical disturbances to which the system may be subjected while in use.

The invention has for a still further object the provision in a flow meter structure of improved means for practically eliminating the effects of shocks or physical disturbances upon the operation of the metering device as well as upon the operation of the indicating means employed therewith.

Still other objects and advantages of the improvements will be apparent from the following description, taken with the accompanying drawings wherein:

Fig. 2 is a vertical sectional view through the flow chamber of my improved system;

Fig. 3 is a transverse sectional view through the flow chamber, taken on the line 3—3 of Fig. 2;

Fig. 4 is a transverse sectional view through the flow chamber, taken on the line 4—4 of Fig. 2;

Fig. 5 is a transverse sectional view through the flow chamber, taken on the line 5—5 of Fig. 2;

Figure 1:
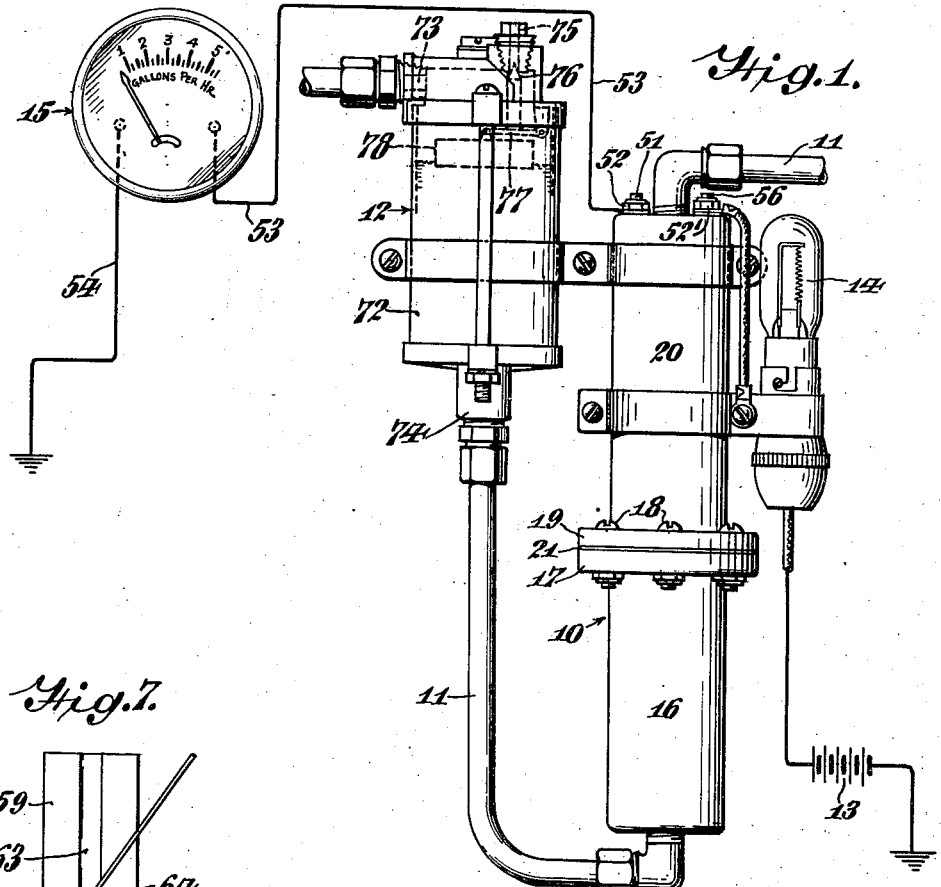
Fig. 1 is a diagrammatic elevational view of my improved flow meter system.

As illustrated diagrammatically in Fig. 1 of the drawings my improved system is adapted for the purpose of indicating the rate of flow of fuel such as gasoline or the like between a source of fuel supply and the internal combustion engine of an automobile or similar vehicle, and comprises a flow chamber 10 connected in the fuel line 11 between the source of supply and the carburetor; an eliminating device 12 for gases, connected in the fuel line 11 between the source of fuel supply and the flow chamber 10; an electrical circuit fed from a source of electric energy such as a battery 13, and having a current varying device therein actuated in response to changes in the rate of flow of the fuel; a current regulator 14 in the circuit for maintaining a substantially constant voltage for the system irrespective of variations in voltage in the source of energy; and an electrical indicator 15 in the circuit, preferably of the voltmeter type and graduated to indicate flow in gallons per hour, for continuously indicating the rate of flow of fuel through the flow chamber 10 during the operation of the system and when this rate is in excess of a predetermined minimum.

As shown in Fig. 2 the flow chamber 10 is formed by a lower cylindrical casing section 16 having an outwardly extending flange 17 on the upper end thereof which is secured by bolts 18 or otherwise to an outwardly extending flange 19 on the lower end of an upper cylindrical casing section 20, with a gasket 21 of suitable material interposed between the two flanges.

Although it may be made of other suitable material, as I have disclosed the same herein the lower casing section 16 is made of cast iron with a tubular inlet member 22 projecting upwardly therein around the inlet opening 23 and spaced uniformly from the outer wall to provide a dashpot cistern 24 in open communication at its upper end with the interior of the flow chamber. The upper end of the tubular member 22 preferably terminates slightly above the juncture of the upper and lower casing sections for reasons hereinafter pointed out, and the diameter of the opening therethrough increases gradually from a point near the lower end thereof to its upper end.

Suspended within the tubular member 22 upon the lower end of a connecting rod 25 is a weight member 26 having a metering disc 27 fitted upon the reduced lower end thereof. The metering disc 27 is preferably constructed of metal and is insulated from the weight member 26 as shown at 28 when the weight member is of metallic construction. A disc 29 of suitable insulating material is provided with a projecting hub 30 within which the upper end of the connecting rod 25 is rigidly secured. Each of a pair of oppositely arranged supporting rods 31 has its upper end bent laterally as shown at 32 and is rigidly secured within a suitable opening in the disc 29. The supporting rods 31 extend downwardly in the dashpot cistern 24 and, as shown herein, the lower ends thereof engage within eyes 33 secured diametrically in the upper end of an annular piston 34 freely movable within the cistern 24. The outer face of the piston 34 is provided with a plurality of circumferential grooves 35 which serve to permit any small particles of dirt in the gasoline to work downwardly past the piston so as not to interfere with its proper operation.

Rigidly secured to the upper face of the disc 29 for longitudinal movement within the upper section 20 of the flow chamber is a movable contactor comprising a transversely extending support 36 having a rigid contact shoe 37 extending laterally from one end thereof and a relatively movable contact shoe 38 pivoted at 39 to its opposite end. The support 36 is rigidly secured to the disc 29 by means of a headed pin 40 passing through a central opening in the support and securely engaging within an opening in the upper face of the disc 29. A small coiled expansion spring 41 having one end secured to a boss 42 riveted or otherwise secured to the rigid contact shoe 37 and its opposite end secured to a boss 43 riveted or otherwise secured to the pivoted contact shoe 38 serves to spread the contact shoes and keep them in engagement with a stationary contact strip 44 and a stationary resistance strip 45 supported longitudinally within the upper section 20 of the flow chamber.

The upper section 20 of the flow chamber casing is preferably molded from suitable insulating material, and is so constructed as to provide oppositely arranged channels 46 extending lengthwise of the wall thereof and having overhanging edge portions 47 forming oppositely arranged slots 48 through which the channels open to the interior of the casing section, and which serve as guideways for the movable contactor.

The contact strip 44 may be made of brass and is of such cross-section as to provide a comparatively tight frictional fit within its channel 46. The resistance strip 45 is likewise so formed as to fit snugly within its channel 46. By forming the channels 46 in the casing section 20 when the section is molded, the channels may readily be made parallel throughout their length, and the parallelism of the contact strip 44 and the resistance strip 45 will be maintained notwithstanding such changes in temperature as would tend to warp or bow these strips if they were rigidly secured at spaced points to the wall of the casing, the maintenance of parallism being important in order to insure proper operation of the movable contactor.

The upper end of the contact strip 44 has secured thereto by a screw 49 or other suitable means a short conductor wire 50 having its outer end soldered or otherwise secured in conducting relation within a terminal bushing 51 molded in the upper end of the casing section 20 and provided with a lock nut 52 by means of which the wiring connection 53 may be made with the indicator 15. The indicator may be grounded through the connection 54 in a well known manner.

A fluid outlet bushing 55 to which the fuel line 11 is connected is molded in the upper end of the section 20. A bushing 56 is also molded in the upper end of the casing section 20 to serve as a terminal for the resistance strip 45. This terminal may also be provided with a lock nut 52' by means of which a wiring connection may be made with the regulator 14. A short conductor wire 57 soldered in the bushing 56 has its lower end soldered or otherwise connected to a stationary contact member 58 preferably riveted to the upper end of the core 59 of the resistance strip 45. Another stationary contact member 60 spaced from the contact member 58 is likewise riveted to the core 59 and has the upper end of the resistance wire 61 soldered thereto. The lower end of the resistance wire 61 is preferably grounded by connecting it to the metallic lower casing section 16. As shown herein, it is connected to the tubular member 22 by means of one of a pair of oppositely arranged screws 62 which serve as stops to limit the movement of the piston 34 and the contactor in an upward direction. The extension of the tubular member 22 outwardly of casing section 16 facilitates the connection of the wire 61 in assembling the device.

Figure 7:
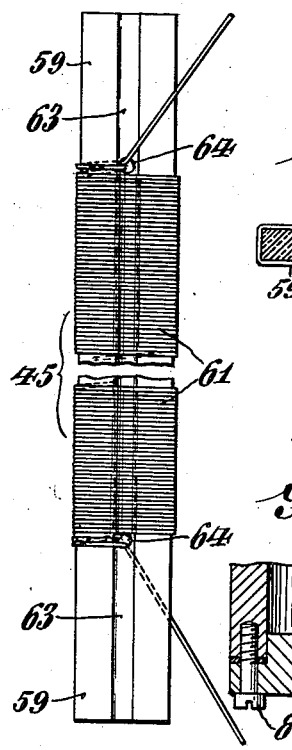
Fig. 7 is a longitudinal view, partly broken away, of the resistance element utilized in the system.
Figure 8:
Fig. 8 is a transverse sectional view through the resistance element shown in Fig. 7.
Figure 6:
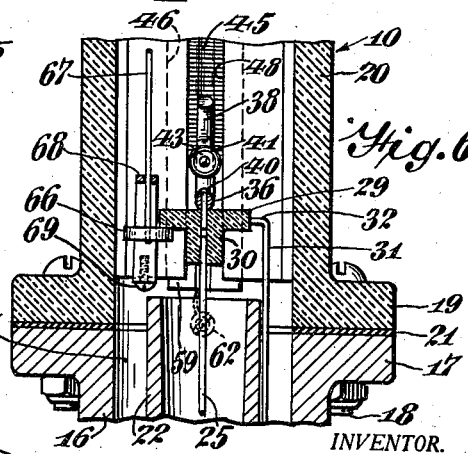
Fig. 6 is a vertical sectional view of a portion of the flow chamber taken at right angles to Fig. 2 and on the line 6—6 thereof.

The core 59 of the resistance strip 45 is preferably made of suitable insulating material and is provided with a groove 63 extending lengthwise of one face thereof as clearly shown in Fig. 7. The resistance wire 61 is spirally wound upon the core and the opposite ends are looped through openings 64 extending transversely through the core and connecting with the groove 63. The coils of the winding are then depressed into the groove 63 by means of a suitable tool. When assembled in casing section 20, the upper end of the wire is connected to the lower stationary contact 60 while the lower end is grounded by connecting it to the metallic tubular member 22 in the manner hereinbefore described. By making the resistance strip in this manner the coils are drawn tightly about the core thus preventing any endwise movement thereof, and forming a smooth, depressed guideway for engagement by the pivoted contact shoe 38. This groove, in cooperation with the lengthwise groove 65 in the contact strip 44, serves to guide the movable contactor in its movement over the resistance strip 45 within the flow chamber.

The relative diameters of the interiorly tapered tubular member 22 and the metering disc 28 are such that when the metering disc is in its lowermost position as shown by the drawings the orifice or passageway between the metering disc and the wall of the tube will permit a slight flow of gasoline therethrough, it being advisable to provide for such a flow in order to prevent any interference with the free movement of the metering disc such as would be likely to result by entirely closing the orifice. The metering disc is supported in its lowermost position by the engagement of the disc 29 on the upper end of the connecting rod 25 with a disc 66 on the lower end of a switch actuating rod 67 the lower end of which is guided in an opening in a small bracket 68 secured to the wall of the upper casing section by means of a screw 69, and the upper end of which is guided in an opening in the stationary contact member 60. The upper end of the switch operating rod 67 is provided with a contact head 70 movable to and from the stationary contact 58 to make and break the circuit from the battery 13 to the resistance 45 in the flow chamber. A small coiled spring 71 between the contact head 70 and the stationary contact 60 operates to move the head 70 into contact with the stationary contact 58 as soon as there is sufficient flow of gasoline through the device to raise the metering disc 27 and thereby lift the disc 29 out of engagement with the disc 66 on the lower end of the switch operating rod 67.

The available electrical systems of automobiles, motor-boats, airplanes and the like are subject to such fluctuations in voltage as to render an electrically-operated flow meter system of little practical value when utilized therewith unless proper provision is made for so controlling the current utilized in the operation of the flow meter as to impress a substantially constant voltage thereon. It is also advisable to utilize a minimum voltage, particularly where the variable resistance unit of the structure and the make-and-break switch are located within the flow chamber and are thus exposed to the gasoline flowing therethrough. I therefore connect in the electrical circuit between the battery 13 and the terminal 56 of the resistance strip 45 a voltage regulator 14 designed to deliver a substantially constant current to the resistance strip.

This regulator may be in the form of an electric lamp having an iron filament. The properties of iron are such that, while the resistance of an iron filament increases with the temperature, at a certain point in the temperature scale the resistance increases much more rapidly. At this point, therefore, the iron filament acts as a current regulator when subjected to varying voltage with the result that a substantially constant current may be obtained notwithstanding variations in voltage. If, for example, the resistance of the wire 61 is 25 ohms and an iron filament is utilized which will pass a current of .2 ampere, a potential difference of 5 volts will be produced across the ends of the wire 61, and this will remain practically constant in spite of variations in battery voltage. With a voltage regulator connected in the circuit in this manner, and constructed to impress upon the resistance 45 a constant voltage approximating the lowest voltage at which the available electrical system is likely to be utilized, due either to a partially exhausted battery or to the use of various appliances such as lighting systems, there is little likelihood of an electric arc of sufficient strength being produced by the action of the movable contactor or the make-and-break switch to ignite any gasoline vapor which may be present in the flow chamber 10.

As an additional safety factor, I have provided means for eliminating gases such as air and gasoline vapor from the gasoline before it reaches the metering device. This means is in the form of a trap or eliminator 12 comprising a casing 72 preferably arranged at or above the upper level of the flow chamber 10 and having an inlet 73 in its upper end to which the fuel line leading from the source of gasoline supply is connected, and an outlet 74 at its lower end from which a section of the fuel line leads to the inlet 23 in the lower end of the flow chamber 10. The casing 72 is provided with a vent opening 75 in its upper end controlled by a needle valve 76 which is connected to a pivoted lever 77 operated by a float 78 within the casing. The float and needle valve are so arranged that when the level of the liquid in the casing drops to a certain point the valve will open and thereby permit the escape of gases such as air and gasoline vapor through the vent opening. Upon the escape of air and vapor from the casing 72 the level of the liquid rises in the casing thereby lifting the float and closing the escape valve. The elimination of these gases avoids any danger which might result from possible arcing within the flow chamber 10 by the operation of the movable contactor or the make-and-break switch. By elevating the eliminating device 12 so that the inlet 73 is at the level of or above the outlet from the flow chamber 10, the latter forms a trap which remains full of gasoline when flow thereof through the device is discontinued. In other words, the flow chamber 10 will be completely filled with gasoline at all times. This construction not only prevents the undesirable effects upon the indicating means of the passage of air and vapor through the flow meter, but it eliminates any danger which might result from the passage of air and gasoline vapor into the flow chamber, or their accumulation therein, exposed to the action of the movable contactor and the circuit interrupting switch.

Figure 9:
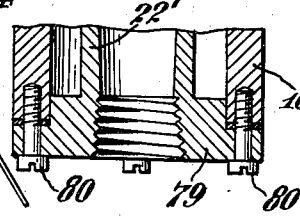
Fig. 9 is a detailed sectional view showing a modified construction of the inlet end of the flow chamber.

In the form of flow chamber illustrated in Figs. 1 and 2 of the drawings, the tubular inlet 22 is formed integrally with the casing section 16. A modified construction is shown in Fig. 9 wherein the tubular inlet 22' is formed integrally with a plug 79 having a threaded opening for connection to the section of the fuel line leading from the eliminator 12. This plug forms the bottom wall for the casing section 16', to which it may be secured by screws 80 passing therethrough into the wall of the casing section.

In the operation of the system disclosed herein gasoline is delivered from the usual supply tank through the fuel line to the air and vapor eliminating device 12 by means of a vacuum feed device or a positively acting pump. With the air and vapor eliminated therefrom by the eliminator 12, the gasoline is then delivered to the lower end of flow chamber 10 through the tapering tubular inlet 22. The pressure of the gasoline upon the metering disc 27 will raise this disc together with the weight member 26 to such an extent as to provide an orifice of a size corresponding to the rate of flow of the gasoline, and it will be apparent that variations in the flow of gasoline through the tubular inlet member 22 will position the metering disc 27 to accord with the rate of flow.

The movements of the metering disc 27 are transmitted through the rod 25 to the movable contactor carried by the disc 29, and the pivoted contact shoe 38 is thereby moved lengthwise over the resistance strip 45 in response to changes in the rate of flow of the gasoline through the flow chamber 10. The movement of the contactor along the resistance strip 45 operates to vary the resistance in the circuit of the indicator 15 in a well known manner, and the rate of flow of the gasoline in gallons per hour or other desired units may be obtained at any moment from the reading of the indicator 15.

As illustrated in Figs. 2, 3 and 4 of the drawings, the rigid contact shoe 37 engages with the contact strip 44 within the longitudinally extending groove 65, and the pivoted contact shoe 38 engages within a longitudinally extending depression in the windings of the resistance wire 61 formed by depressing the windings within the groove 63 in the core 59. The engagement of the contact shoes within the grooves of the contact strip and the resistance strip serves to guide the movable contactor and the metering disc in their movements corresponding to variations in flow of the gasoline through the flow chamber. The substantial length of the rigid contact shoe 37 also assists materially in guiding these elements in a direction axially of the flow chamber. The contact shoes 37 and 38 are prevented from being dislodged from their engagement with the contact strip and the resistance strip by the overhanging edges 47 which form the slots 48 within which the contact shoes operate. It will be understood, however, that these contact shoes are out of engagement with the overhanging edges 47 during the normal operation of the system, and that this particular structure merely serves to prevent the contact shoes from being entirely dislodged from the contact strip and the resistance strip when the system is subjected to any unusual physical disturbance.

As heretofore described, the flow chamber 16 is completely filled with gasoline at all times, and, as will be clear from the structure shown in Fig. 2, the dashpot cistern 24 is likewise completely filled with gasoline at all times, there being no flow through the cistern 24 however, even during operation of the system. Inasmuch as the piston 34 is connected to the metering disc 27 so as to partake of the movements thereof due to variations in rate of flow of the gasoline through the flow chamber, the piston serves to dampen any abnormal movements of the metering disc due to sudden surges of gasoline in the fuel line or in the flow chamber by reason of unusual road conditions, sudden increase or decrease in speed, or abrupt changes in direction of movement of the vehicle with which the system is used.

The particular form of piston illustrated in Fig. 2 has been found to be unusually satisfactory for dampening any abnormal movements of the metering disc. This is attributed largely to the peculiar structure of the dashpot wherein the piston is of annular form, thus permitting the passage of the liquid in the cistern over both the inner and outer surfaces thereof. Also, with such a structure, the frictional resistance due to contact of the piston with other parts of the device is reduced to a minimum.

The operation of the various other elements of the system will be apparent from the above structural description. While a certain arrangement of the elements, as well as a certain form of these elements, has been disclosed, it is to be understood that these forms and their arrangement are intended for illustrative purposes only and that my invention contemplates such changes therein as come within the scope of the appended claims. It is to be understood further that, while it has been described in a form adapting it for use in indicating the rate of flow of a liquid fuel, the system, or parts thereof, is equally adapted for use with gaseous fluids, and for indicating rate of fluid flow generally, without regard to the purpose for which the fluid is employed.

Having thus described my invention, what I claim is:

1. In a flow meter structure, a flow chamber comprising an outer tubular member, an inner tubular member concentrically arranged in the outer member and having one end secured to the adjacent end of the outer member to form an open-ended cistern, means for providing a flow of liquid through said inner member, a metering device in said inner member and movable in response to changes in the rate of flow of the liquid therethrough, an annular piston in said cistern, and connecting means between said piston and said metering device for imparting to said piston movements in response to the movements of said metering device.

2. In a flow meter structure, a flow chamber having a fluid inlet and a fluid outlet, a tapered metering tube surrounding said inlet and extending into said chamber in spaced relation from the side wall thereof, an orifice changing member movable in said tube in response to changes in the rate of flow of fluid therethrough, and a piston surrounding said tube and connected to said member for movement therewith to dampen the movements of said member.

3. In a flow meter system, a flow chamber having a fluid inlet and a fluid outlet, a tapered metering tube surrounding said inlet and extending into said chamber in spaced relation from the side wall thereof, an orifice changing member movable in said tube in response to changes in the rate of flow of fluid therethrough, indicator means responsive to the movements of said member, and a piston surrounding said tube and connected to said member for movement therewith to dampen the movements of said indicator means.

4. In a flow meter structure, a flow chamber comprising an outer tubular member, an interiorly tapered inner tubular member arranged centrally of and spaced from the outer member, a metering member movably supported in said inner tubular member, and an annular piston fixedly connected to said metering member and movable in the space between said tubular members.

5. In a flow meter structure, a flow chamber comprising an outer tubular member, an interiorly tapered inner tubular member arranged centrally of and spaced from the outer member, a metering member movably supported in said inner tubular member, indicator controlling means fixedly connected to said metering member, and an annular piston fixedly connected to said indicator controlling means and movable in the space between said tubular members.

6. In a flow meter structure, a flow chamber comprising an outer tubular member, an interiorly tapered inner tubular member arranged centrally of and spaced from the outer member and having one end secured to the outer member, a metering member movably supported in said inner tubular member, an annular piston movable in the space between said tubular members, and means for actuating said piston comprising a pair of oppositely arranged supports hingedly connected to said piston and fixedly connected to said metering member.

CARROLL P. SHERWOOD.